J. W. HAZELRIGG.
Rotary Churn.
No. 198,020. Patented Dec. 11, 1877.
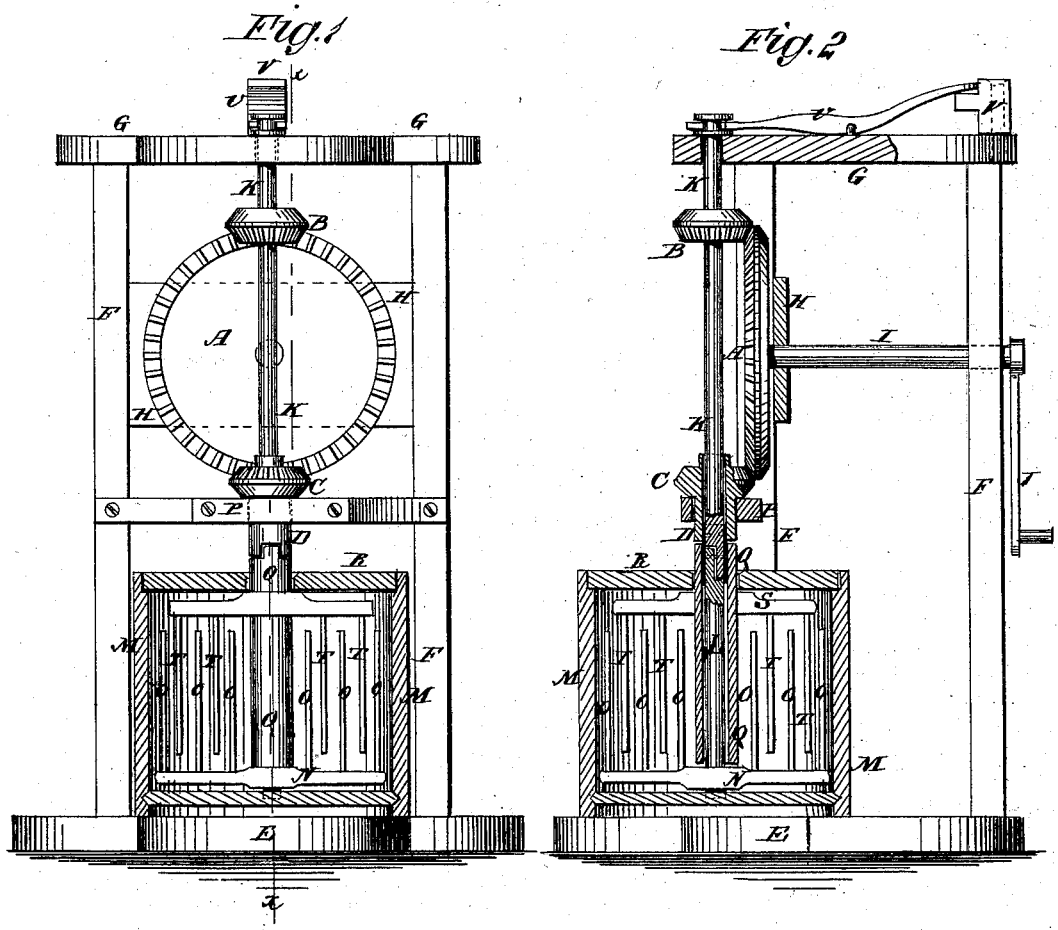

UNITED STATES PATENT OFFICE.

JOHN W. HAZELRIGG, OF EL DARA, ILLINOIS, ASSIGNOR TO HIMSELF, WESLEY T. HAZELRIGG, AND V. P. HUSTEAD, OF SAME PLACE.

IMPROVEMENT IN ROTARY CHURNS.

Specification forming part of Letters Patent No. 198,020, dated December 11, 1877; application filed May 5, 1877.

*To all whom it may concern:*

Be it known that I, JOHN W. HAZELRIGG, of El Dara, in the county of Pike and State of Illinois, have invented a new and useful Improvement in Churning Apparatus, of which the following is a specification:

Figure 1 is a front view of my improved churning apparatus, the churn-body being shown in section; and Fig. 2 is a vertical section of the same, taken through the line $x\ x$, Fig. 1.

Similar letters of reference indicate corresponding parts.

The object of this invention is to furnish an improved churning apparatus which shall be simple in construction, convenient in use, and effective in operation, bringing the butter very quickly.

The invention will first be described in connection with the drawing, and then pointed out in the claim.

E is the platform upon which the churn-body stands, and to which are attached the lower ends of three posts, F, two in front, and at such a distance apart as to receive the churn-body between them, and one in the rear. The upper ends of the posts F are connected by a board, G.

In bearings in the cross-bar H, attached to the front posts F, and in the rear post F, revolves a shaft, I, to the rear end of which is attached the crank J, by means of which the apparatus is operated.

To the forward end of the shaft I is attached a large bevel-gear wheel, A, the teeth of which mesh into the teeth of the two small bevel-gear wheels B C. The gear-wheel B is placed above the gear-wheel A, and is attached to the vertical shaft K, the upper end of which revolves in bearings in the top board G.

The shaft K passes down through the gear-wheel C, placed below the gear-wheel A, and its lower end is connected with the end of the dasher-shaft L by being slipped into a short tube attached to said dasher-shaft, and having their adjacent ends halved to each other, as shown in Fig. 2.

The lower end of the dasher-shaft L revolves in a step in the bottom of the churn-body M, and to it, near its lower end, is attached a cross-bar, N, to which are attached a number of upwardly-projecting arms, O.

The hub D of the gear-wheel C revolves in bearings in the cross-bar P, attached to the front posts F a little above the top of the churn-body M. The lower end of the hub D has a transverse notch or groove formed in it, to receive a tenon or tongue formed upon the upper end of the hollow dasher-shaft Q, through which the dasher-shaft L passes. The hollow dasher-shaft Q revolves in a hole in the center of the churn-cover R, and to it, just below said churn-cover, is attached a cross-bar, S, provided with a number of downwardly-projecting arms, T, which are so arranged as to alternate with the arms O.

By this arrangement, as the gear-wheel A is revolved the two dashers N O and S T will be revolved in opposite directions, throwing the milk into violent agitation, and bringing the butter in a very short time.

Around the upper end of the shaft K, above the top board G, is formed a ring-groove, to receive the forked end of the lever U, which is slightly bent, and is pivoted at its bend or angle to the top board G, so that by pressing down the rear end of the said lever U the shaft K will be raised and disconnected from the dasher-shaft L, allowing the hub D and the upper end of the dasher-shaft Q to be disconnected and the churn and dashers to be removed.

When the churn has been replaced the rear end of the lever U is raised, allowing the shaft K to drop, and the churn is ready to be again operated.

The lever U is locked in either position by turning the button V above or below its rear end.

Having thus described my invention, I claim as new and desire to secure by Letters Patent—

The combination of the lever U and button V with the grooved upper end of the shaft K and the top board G of the frame, for throwing the apparatus into and out of gear, substantially as herein shown and described.

JOHN W. HAZELRIGG. [L. S.]

Witnesses:
CICERO GARD,
DAVID LIGGETT.